United States Patent
Dupielet et al.

(10) Patent No.: US 9,057,408 B2
(45) Date of Patent: Jun. 16, 2015

(54) COUPLING DEVICE, AND HOME AUTOMATION EQUIPMENT INCLUDING SUCH A DEVICE

(75) Inventors: Norbert Dupielet, Sallanches (FR); Eric Lagarde, Sallanches (FR)

(73) Assignee: SOMFY SAS, Cluses (FR)

( * ) Notice: Subject to any disclaimer, the term of this patent is extended or adjusted under 35 U.S.C. 154(b) by 0 days.

(21) Appl. No.: 14/130,614

(22) PCT Filed: Jul. 6, 2012

(86) PCT No.: PCT/EP2012/063276
§ 371 (c)(1),
(2), (4) Date: Mar. 14, 2014

(87) PCT Pub. No.: WO2013/007642
PCT Pub. Date: Jan. 17, 2013

(65) Prior Publication Data
US 2014/0206460 A1 Jul. 24, 2014

(30) Foreign Application Priority Data

Jul. 8, 2011 (FR) ...................................... 11 56216

(51) Int. Cl.
*F16D 3/207* (2006.01)
*F16D 3/18* (2006.01)
*E06B 9/68* (2006.01)
*E06B 9/72* (2006.01)
*F16D 3/44* (2006.01)
*E05F 15/00* (2006.01)

(52) U.S. Cl.
CPC ... *F16D 3/18* (2013.01); *E06B 9/68* (2013.01); *E06B 9/72* (2013.01); *F16D 3/44* (2013.01); *E05F 15/00* (2013.01)

(58) Field of Classification Search
USPC ................. 464/111, 114–116, 120–125, 153; 160/904, 310, 311
See application file for complete search history.

(56) References Cited

U.S. PATENT DOCUMENTS

| 384,388 | A | * | 6/1888 | Perrin | 464/153 X |
| 741,106 | A | * | 10/1903 | Burdick | 464/153 |
| 1,592,254 | A | * | 7/1926 | Blaine | 464/153 X |
| 1,652,566 | A | * | 12/1927 | Emig | 160/904 |

(Continued)

FOREIGN PATENT DOCUMENTS

| DE | 19736770 A | 3/1999 |
| EP | 751 278 A | 1/1997 |

(Continued)

*Primary Examiner* — Gregory Binda
(74) *Attorney, Agent, or Firm* — Dowell & Dowell, PC

(57) ABSTRACT

A coupling device installed between an output shaft of an electric motor and an input shaft of a reducing gear of an actuator for driving a screen or a hatch that is part of home-automation equipment for closure, solar protection, or projection and which includes a first member rotatably secured to the output shaft, and which is provided with at least one longitudinal outer groove, and a second member rotatably secured to the input shaft, and which is provided with at least one longitudinal outer groove and wherein the coupling device further includes an element for coupling the first and second members together in rotation, and which has, on at least one surface thereof, at least two series of lugs which project from the at least one surface, wherein the lugs are inserted into the longitudinal outer groove of the first member and the longitudinal outer groove of the second member, respectively.

19 Claims, 7 Drawing Sheets

(56) References Cited

U.S. PATENT DOCUMENTS

| | | | |
|---|---|---|---|
| 2,011,147 A | | 8/1935 | Haselau |
| 2,111,799 A | * | 3/1938 | Newpher ............... 403/359.1 X |
| 2,380,952 A | * | 8/1945 | Dewey ................... 403/359.1 X |
| 4,421,196 A | * | 12/1983 | Orain ........................ 464/115 X |
| 4,421,494 A | * | 12/1983 | Futamura et al. ............. 464/111 |
| 4,487,593 A | * | 12/1984 | Hans-Heinrich ............. 464/111 |
| 5,951,401 A | * | 9/1999 | Kita et al. ................. 464/124 X |

| | | | | |
|---|---|---|---|---|
| 2010/0294440 A1 | * | 11/2010 | Li et al. ........................ 160/310 |

FOREIGN PATENT DOCUMENTS

| | | | | |
|---|---|---|---|---|
| EP | 0751278 A1 | | 1/1997 | |
| FR | 388518 | * | 8/1908 | ................... 464/115 |
| FR | 970 629 A | | 1/1951 | |
| FR | 970629 A | | 1/1951 | |
| SE | 4110 | * | 2/1893 | ................... 464/153 |

* cited by examiner

COUPLING DEVICE, AND HOME AUTOMATION EQUIPMENT INCLUDING SUCH A DEVICE

BACKGROUND OF THE INVENTION

1. Field of the Invention

The invention relates to a coupling device to be arranged between an output shaft of an electric motor and an input shaft of a reducing gear for driving a screen or a leaf that is part of closing, solar protection or projection equipment. The invention also relates to home automation equipment comprising, inter alia, such a coupling device.

According to the present invention, a screen comprises a movable part consisting of a sliding panel or a set of strips which is moved, generally by rolling, between a raised position, wherein it leaves an opening clear, and a lowered position, wherein it shuts off said opening. Such a screen may be a rolling shutter or door. The screen may also be a blind for solar protection, for example a terrace blind or a Venetian blind. A screen may also be a screen used for image projection, notably in video format. According to the invention, a leaf is a part of closing device, such as a door leaf of a gate or a shutter hinged about a vertical axis on the edge of a window.

2. Brief Discussion of the Related Art

The use of an electric motor associated with a reducing gear for driving the rolling shaft of the flexible sliding panel of a rolling shutter or blind is known. These devices are frequently integrated within a so-called tubular actuator which is inserted inside a rolling tube and which is rigidly connected thereto by means of a wheel. The coupling between the output shaft of the motor and the input shaft of the reducing gear is sometimes difficult since each of these devices is equipped with bearings supporting the respective shafts thereof, which are not necessarily aligned or even parallel. This gives rise to noise from running the actuator, and premature wear of the reducing gear, at least in some configurations.

One solution incorporating a universal joint on one of the shafts may be envisaged. However, it is relatively expensive and complex to implement, while only allowing misalignment of the axes of the shafts to be coupled to a limited extent.

Moreover, U.S. Pat. No. 2,011,147 discloses the use of an assembly of mutually movable parts, for rotatably securing coupling elements each provided with a hub and a broadened cross-section. The three-part assembly comprises two lateral parts each interacting with a coupling element and a central part. The manufacture of this device is complex and costly. Moreover, the transmission of the torque between a coupling element and an associated lateral part is based on the engagement of ribs in grooves, with merely axial relative movement capability. The parts of the three-part assembly and the coupling elements are complex and thus need to be produced with precision and assembled with care, which increases the cost of the system according to the prior art.

Similar problems are encountered with the device known from FR-A-970 629.

SUMMARY OF THE INVENTION

The invention is more particularly intended to remedy these drawbacks by proposing a new coupling device that is simple to manufacture and use and reliable over time, while being suitable for integration in home automation equipment.

For this purpose, the invention relates to a coupling device between an output shaft and an input shaft, such as an output shaft of an electric motor and an input shaft of a reducing gear of an actuator for driving a screen or a leaf that is part of home automation equipment for closing, solar protection or projection. This device includes a first member which is rotatably secured, or suitable for being rotatably secured, to the output shaft, and which is provided with at least one longitudinal outer groove, and a second member which is rotatably secured, or suitable for being rotatably secured, to the input shaft, and which is provided with at least one longitudinal outer groove. According to the invention, this device further includes an element for rotatably coupling the first and second members together, which has, on at least one surface thereof, at least two series of lugs projecting from said surface, wherein the lugs are inserted into the longitudinal outer groove of the first member and the longitudinal outer groove of the second member, respectively.

According to the invention, a coupling element such as a sleeve or a plate is an integral or multi-part part which, once manufactured, is rigid, enabling effective transmission of a drive torque.

By means of the invention, it is possible to provide, in a compact space, effective coupling between the output shaft and the input shaft, the manufacture and/or assembly of the two series of projecting lugs being simple to carry out. The use of a coupling element, such as a sleeve or a plate, and not of three mutually movable parts, ensures effective torque transmission. Furthermore, the lugs offer movement capabilities in a plurality of directions in relation to the longitudinal outer grooves of the first and second members. This makes it possible to simplify this coupling element and these members.

According to advantageous, but optional, aspects of the invention, such a device may incorporate one or a plurality of the following features in any technically feasible combination thereof:

- The coupling element is a sleeve in the internal volume whereof the first and second members are inserted at least partially and the lugs of the two series of lugs project from an inner radial surface of said sleeve.
- The coupling element is a plate arranged between the first and second members, along an axis of rotation of one of these members, and the lugs of the two series of lugs project from two axial surfaces of this plate, in two opposite directions parallel to the axis of rotation.
- Each lug includes a spherical section head projecting from the surface of the coupling element.
- Each first and second member is provided with a plurality of longitudinal outer grooves, whereas the coupling element is equipped with a plurality of lugs, equal in number to the sum of the numbers of longitudinal outer grooves of the first and second members, with a first series of lugs situated in the vicinity of a first axial end of the coupling element and each respectively inserted into one of the longitudinal outer grooves of the first member and a second series of lugs situated in the vicinity of a second axial end of the coupling element, opposite the first axial end, each respectively inserted into one of the longitudinal outer grooves of the second member.
- The longitudinal outer grooves and the lugs are regularly distributed, respectively about the longitudinal and central axes of the first and second members and the coupling element.
- The lugs of the second series are offset, angularly about a longitudinal and central axis of the coupling element, in relation to the lugs of the first series.

The angular offset between two lugs respectively belonging to the first and second series has a value equal to half the value of the angular offset between two lugs of the same series.

The lugs of the two series are aligned in directions parallel to a central axis of the coupling element.

Each of the first and second members is provided with three longitudinal outer grooves distributed at 120° about a central axis of this member and the coupling element is equipped with two series of three lugs, the lugs of each series being distributed at 120° about a longitudinal and central axis of the coupling element.

The coupling element is provided, on at least one angular sector situated between two lugs of the same series, with a recess.

The first and second members are identical parts mounted on the output shaft, on one hand, and on the input shaft, on the other.

The lugs are parts mounted on the coupling element and locked thereon in rotation, by means of wedging, crimping or engaging shapes. In this case, it may be envisaged that the coupling element is provided with axial grooves each suitable for slidably receiving a lug anchoring shank and each bordered by a space for receiving an end heel of the anchoring shank. Alternatively, the coupling element is provided with housings for receiving and locking lug anchoring shanks.

The lugs are integral with the coupling element.

If the coupling element is a plate, an axial surface of the first member, the second member or the plate is provided with a portion projecting in a direction parallel to a central axis of the plate, this projecting portion bearing on an axial surface of the plate, of the first member or the second member.

The invention also relates to home automation equipment including a leaf, a closing or solar protection screen or a projection screen, and a coupling device as mentioned above, inserted between an output shaft, particularly of an electric motor, and an input shaft, particularly of a reducing gear for driving the leaf or screen.

BRIEF DESCRIPTION OF THE SEVERAL VIEWS OF THE DRAWINGS

The invention will be understood more clearly and further advantages thereof will emerge more specifically in the light of the following description of the first embodiments of a coupling device and equipment according to the principle thereof, given as examples and with reference to the appended figures wherein:

FIG. 5 is a section similar to FIG. 3 for the embodiment in FIG. 4, FIG. 7 is a section similar to FIG. 3 for the embodiment in FIG. 6.

DETAILED DESCRIPTION OF THE INVENTION

Figure 1:
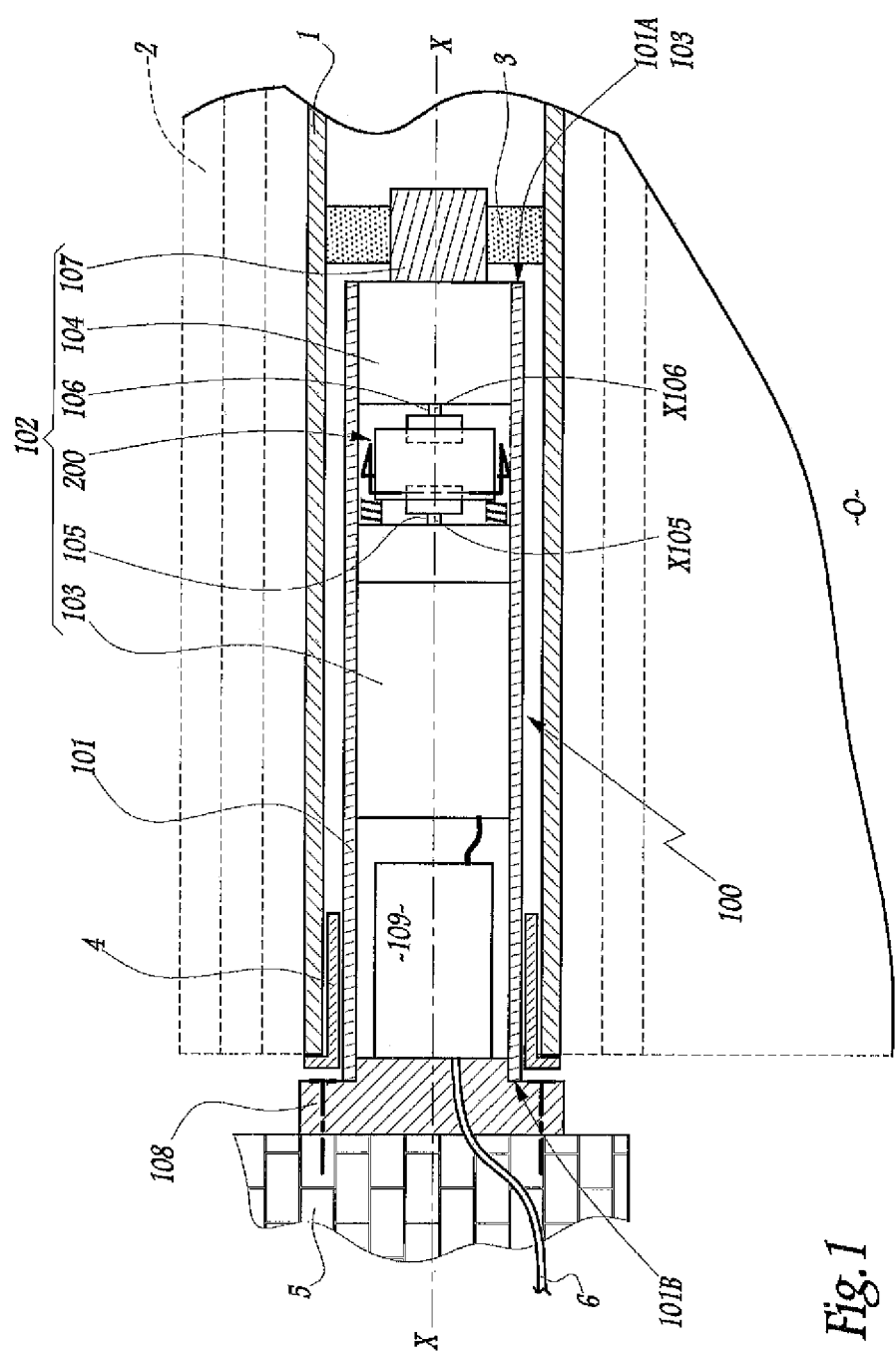
FIG. 1 is a schematic illustration of closing equipment according to the invention.

FIG. 1 represents a tubular actuator 100 suitable for rotating a rolling tube 1 whereon a sliding panel 2 for closing off an opening O can be rolled. The tube 1 is rotated by the actuator 100 about a rotational axis X-X which is arranged horizontally in the upper part of the opening. The opening O is, for example, provided in the walls of a building. The actuator 100, the tube 1 and the sliding panel 2 thus form a motor-driven rolling shutter.

The actuator 100 includes a fixed cylindrical tube 101 wherein a gear motor 102, including an electric motor 103 and a reducing gear 104, is mounted. The output shaft of the motor 103 is referenced 105 and the input shaft of the reducing gear 104 is referenced 106.

The output shaft 107 of the reducing gear 104 projects at one end 101A of the fixed tube 101 and actuates a wheel 3 rotatably secured to the tube 1.

The rolling tube 1 then rotates about the axis X-X and the fixed tube 101 by means to two pin joints. A ring-bearing 4, mounted on the outer periphery of the tube 101, in the vicinity of the end 101B thereof opposite the end 101A, acts as the first pin joint. The second pin joint is fitted at the other end of the tube 1 and cannot be seen in FIG. 1.

The actuator 100 also includes an attachment part 108 projecting at the end 101B of the tube 101 and is suitable for attaching the actuator 100 on a frame 5 of the building containing the opening O. This attachment part 108 is further suitable for closing off the tube 101, and for supporting a control module 109 of the power supply of the motor 103. This control module is powered by a mains cable 6.

A coupling device 200 arranged between shafts 105 and 106 is suitable for transmitting the output torque from the motor 103 to the reducing gear 104. The longitudinal and central axis of the shaft 105 is referenced X105. The longitudinal and central axis of the shaft 106 is referenced X106. In theory, these axes are parallel, aligned with each other and merged with the axis X-X. In practice, this is not necessarily the case, the axes X105 and X106 may be parallel, but not merged, or sequent, according to the manufacturing tolerances of the constituent elements of the actuator 100 and the quality of the assembly thereof. The device 200 is suitable for adapting to these alignment defects.

During the operation of the actuator 100, the gear motor 102 rotates the shaft 7 which, in turn, rotates the tube 1 via the wheel 3. In the gear motor 102, the drive torque of the shaft 107 is transmitted from the shaft 105 to the shaft 106, by means of the device 200.

Figure 2:
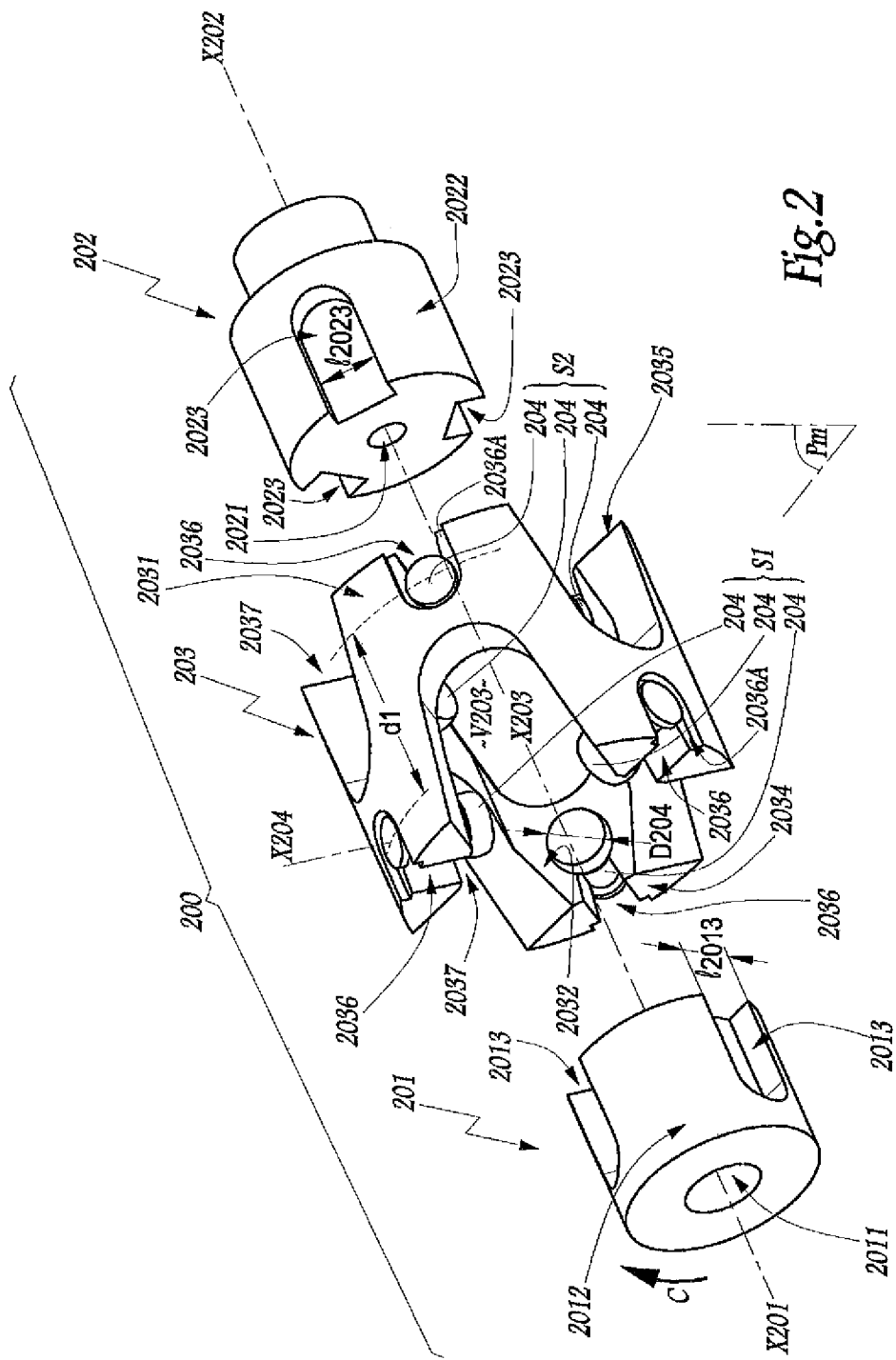
FIG. 2 is an exploded perspective view of a coupling device used in the equipment in FIG. 1.
Figure 3:
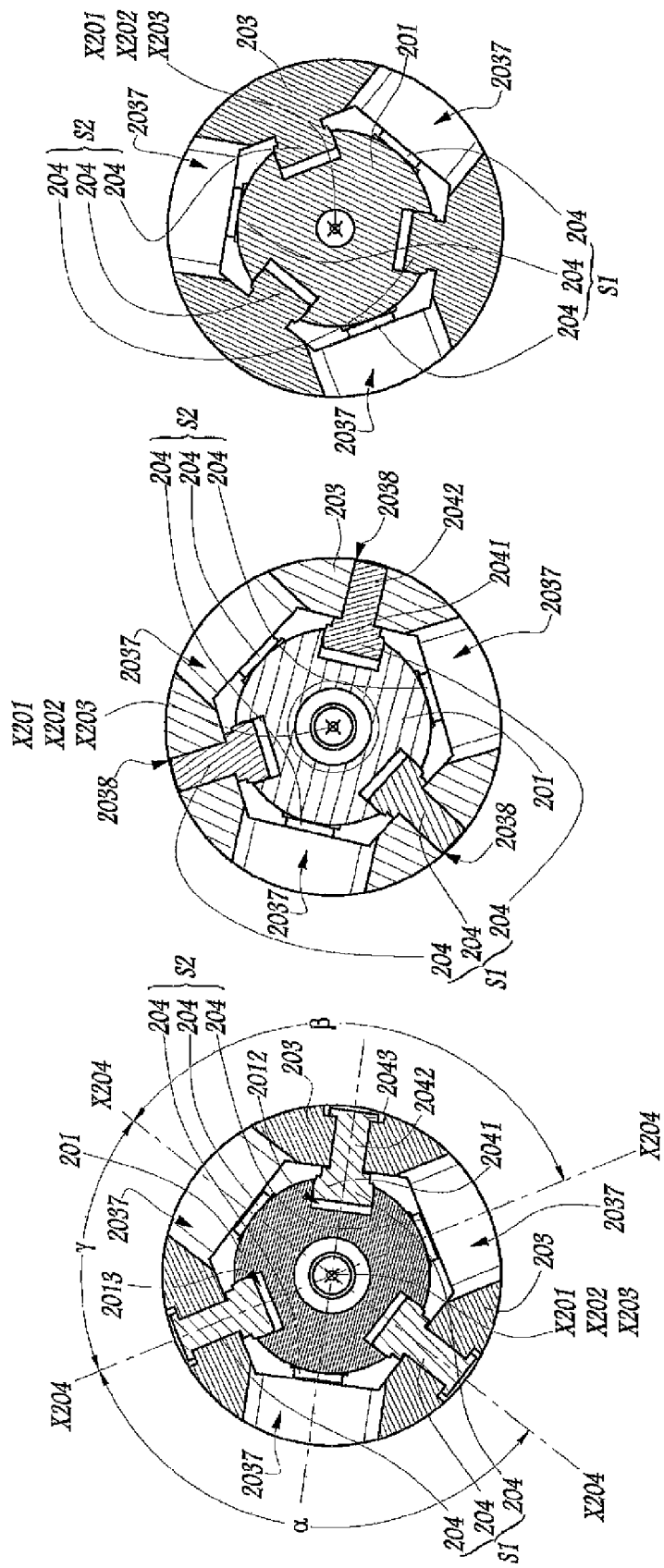
FIG. 3 is a section on a larger scale along the line III-III in FIG. 1.

As seen more particularly in FIGS. 2 and 3, the device 200 includes a first end piece 201 made of sintered metal provided with a central bore hole 2011 centred on a longitudinal axis X201 of the end piece 201. The outer radial surface 2012 of the end piece 201 is cylindrical with a circular cross-section centred on the axis X201. It is provided with three longitudinal outer grooves 2013 regularly distributed about the axis X201, i.e. mutually forming an angle of 120° about the axis X201. The grooves 2013 open onto an end of the first end piece 201 and may be described as longitudinal, in that the larger dimension thereof is parallel to the axis X201.

The device 200 also includes a second end piece 202 also made of sintered metal and which is provided with a central bore hole 2021 centred on a longitudinal axis X202 of the end piece 202. The outer radial surface 2022 of the end piece 202 is cylindrical with a circular cross-section centred on the axis X202, except at the three longitudinal outer through grooves 2023, the larger dimension whereof is parallel to the axis X202 and which are distributed, in the surface 2022, at 120° about the axis X202.

The respective dimensions of the bore holes 2011 and 2021 are provided to enable force fitting of the end pieces 201 and 202 respectively on the shaft 105 and on the shaft 106. When these end pieces are fitted in this way, they are rotatably secured to said shafts and the axes X105 and X201, on one hand, and X106 and X202, on the other, merge.

Producing the end pieces 201 and 202 in sintered metal is suitable for obtaining parts wherein the geometry is well controlled, which are resistant and with a particularly attractive cost price. They may then be clamp-fitted onto the shafts. Alternatively, according to the torques involved, these end pieces may also be produced by machining or injection moulding, from plastics or zamak. They are then mounted onto grooved shafts for example for the rotatable securing thereof.

The coupling device 200 also includes a sleeve 203 acting as a coupling element between the end pieces 201 and 202, which has a circular cross-section and extends about a longitudinal and central axis X203. The inner radial surface of the sleeve is referenced 2031 and the outer radial surface is referenced 2032. The internal volume of the sleeve 203 is referenced V203, this volume being radially externally bordered by the surface 2031. The sleeve 203 is equipped with six lugs 204 respectively projecting from the surface 2031 and towards the axis X203 in the volume V203, respectively in the vicinity of a first axial end surface 2034 of the sleeve 203 and a second axial end surface 2035 of this sleeve, opposite the first.

The parts 203 and 204 are preferentially obtained by machining or injection moulding of plastic or zamak.

The sleeve 203 is provided, in the vicinity of the end surface 2034 thereof, with three slots 2036 bordered by a rabbet 2036A on the side of the surface 2032 and which pass through the sleeve 203, from the surface 2031 towards the surface 2032, radially in relation to the axis X203. The slots 2036 open onto the surface 2034 and have a decreasing width, measured in an orthoradial direction in relation to the axis X203, on moving away from the end surface 2034.

Moreover, each lug 204 includes a head 2041 protruding from the surface 2031 towards the axis X203, and an anchoring shank 2042 inserted into a slot 2036. The head 2041 of each lug is a spherical segment. Opposite the head 2041 thereof, each lug 204 has a circular heel 2043, greater in diameter than the minimum width of a slot 2036, in the part thereof furthest from the end surface 2034, but less than the minimum width of a rabbet 2036A. It is thus possible to hold a lug 204 in position in each slot 2036, each lug being secured, in a parallel direction in relation to a central axis X204 of the anchoring shank 2042, by engaging the head 2041 with the surface 2031, on an inner side of the sleeve 203, and engaging the heel 2043 with the rabbet 2036A, on the outer side of the sleeve. Advantageously, the heels 2043 do not protrude from the outer surface 2032 of the sleeve.

The lugs 204 are distributed in a first series S1 of three regularly distributed lugs 204, at 120° about the axis X203 and close to the end surface 2034, insofar as they are received in slots 2036 opening onto this end surface. Three further lugs 204 form a second series S2 which is close to the second end surface 2035. They are arranged in slots 2036 opening onto this surface and regularly distributed, at 120°, about the axis X203. The offset angle, about the axis X203, of the axes X204 of two lugs 204 of the first series S1 is referenced a. This angle equals 120° and it has the same value as the offset angle β, about the axis X203, of the axes X204 of two lugs of the second series S2.

The lugs 204 of the first series S1 and the lugs 204 of the second series are arranged on either side of a median plane $P_M$ of the sleeve, this plane being perpendicular to the axis X203 and equidistant from the surfaces 2034 and 2035. The distance d1 between the series of lugs S1 and S2, measured parallel to the axis X203, may be optimised: the longer this is, the less sliding is required between each lug 204 and each groove 2013 or 2023, favouring enhanced accounting for shaft misalignment.

The lugs 204 are identical. The maximum diameter of the heads 2041 which are circular and centred on the axes X204 of the various lugs is referenced D204. The widths of the grooves 2013 and 2023 measured along orthoradial directions in relation to the axes X201 and X202, respectively, are referenced $I_{2013}$ and $I_{2023}$. The diameter D204 is chosen to be slightly less than the widths $I_{2013}$ and $I_{2023}$ which are identical, to enable sliding and guidance of the heads 2041 in the grooves 2013 and 2023.

In this way, in the assembled configuration of the device 200, as shown in FIG. 3, it is possible to insert the end pieces 201 and 202 into the volume 203 by placing the heads 2041 of the lugs 204 of the series S1 in the grooves 2013 of the first end piece 201, while the heads 2041 of the lugs 204 of the series S2 are placed in the grooves 2023 of the second end piece 202.

A torque C about the axis X201 may thus be transmitted from the end piece 201 to the sleeve 203, by engaging the lugs 204 of the series S1 with the grooves 2013, and from the sleeve 203 to the end piece 202 by engaging the lugs 204 of the series S2 with the grooves 2023.

It is noted that, between two lugs 204 of the series S1, the sleeve 203 is provided with first recesses 2037 suitable for lightening same and opening onto the end surface 2034. Similarly, further recesses 2037 are provided between two lugs 204 of the series S2 and open onto the end surface 2035.

As seen in FIG. 3, the first recesses 2037 extend over an angular sector between two lugs 204 of the series S1. Similarly, the further recesses 2037 extend over an angular sector between two lugs of the series S2. These recesses extend from a surface 2034 or 2035 to beyond the axes X204, along the axis X203.

Moreover, the lugs 204 of the series S1 are angularly offset in relation to the lugs 204 of the series S2 by an angle γ equal to 60°, i.e. half the angle α. An angular offset, regardless of the offset angle, may be suitable for simplifying the manufacture of the sleeve 203. Alternatively, it is possible to keep the lugs of the series S1 and S2 aligned.

The device 200 is suitable for effective torque transmission between the end pieces 201 and 202, while the axes X201 and X202 thereof may not be aligned. Indeed, the heads 2041 of the lugs 204 inserted into the grooves 2013 and 2023 are suitable for slight axial movement in the grooves 2013 and 2023 of the end pieces 201 and 202. This relative movement is suitable for offsetting an alignment defect of these axes when rotating the shafts 105 and 106 whereon the end pieces 201 and 202 are mounted, respectively.

In the second to fifth embodiments of the invention shown in FIGS. 4 to 7, the elements equivalent to those of the first embodiment bear the same references. Hereinafter, only the aspects whereby these embodiments differ from the first are described.

Figure 4:
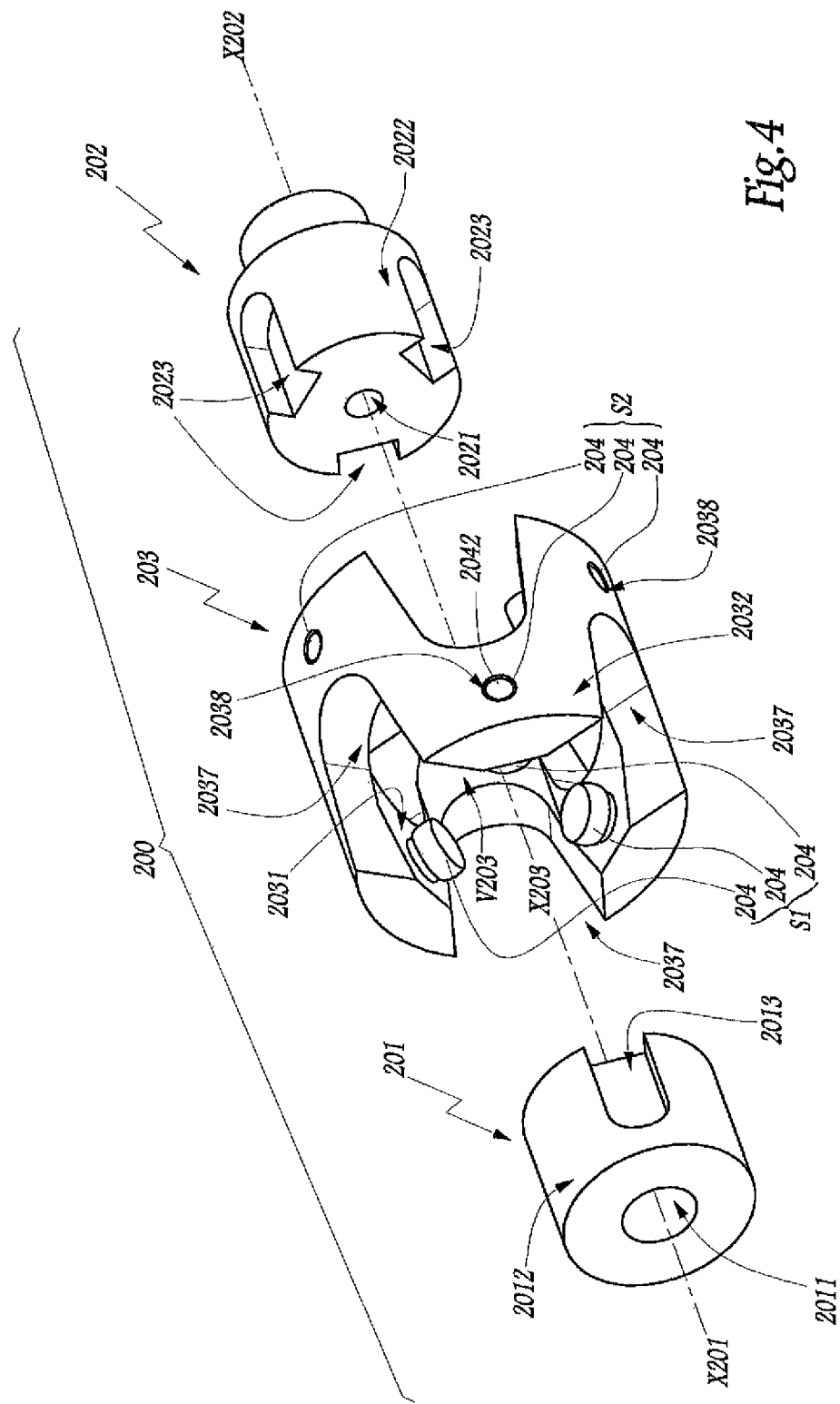
FIG. 4 is a view similar to FIG. 2 for a coupling device according to a second embodiment of the invention.

In the embodiment shown in FIGS. 4 and 5, the shanks 2042 of the lugs 204 are devoid of heels and are received in corresponding bore holes 2038 of the sleeve 203 wherein they are force-fitted. This assembly is sturdier than that of the first embodiment.

Figure 6:
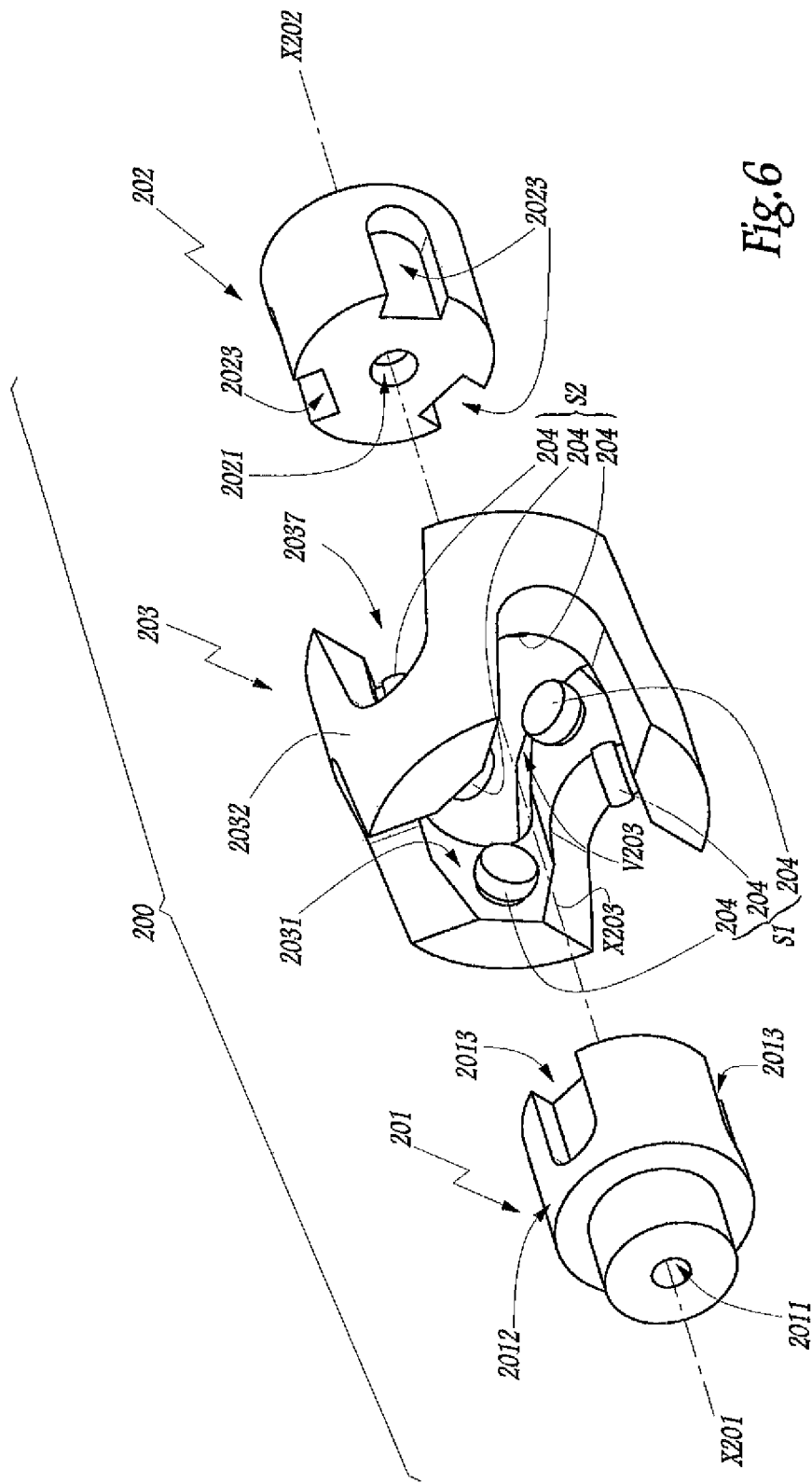
FIG. 6 is a view similar to FIG. 2 for a coupling device according to a third embodiment of the invention.

In the third embodiment shown in FIGS. 6 and 7, the lugs 204 and the sleeve 203 are integral. In this embodiment, the offset by the angle γ, about the axis X203, between the lugs 204 of the series S1 and the lugs 204 of the series S2 enables the manufacture of the sleeve 203 by sintering, without using complex slide moulds.

Figure 8:
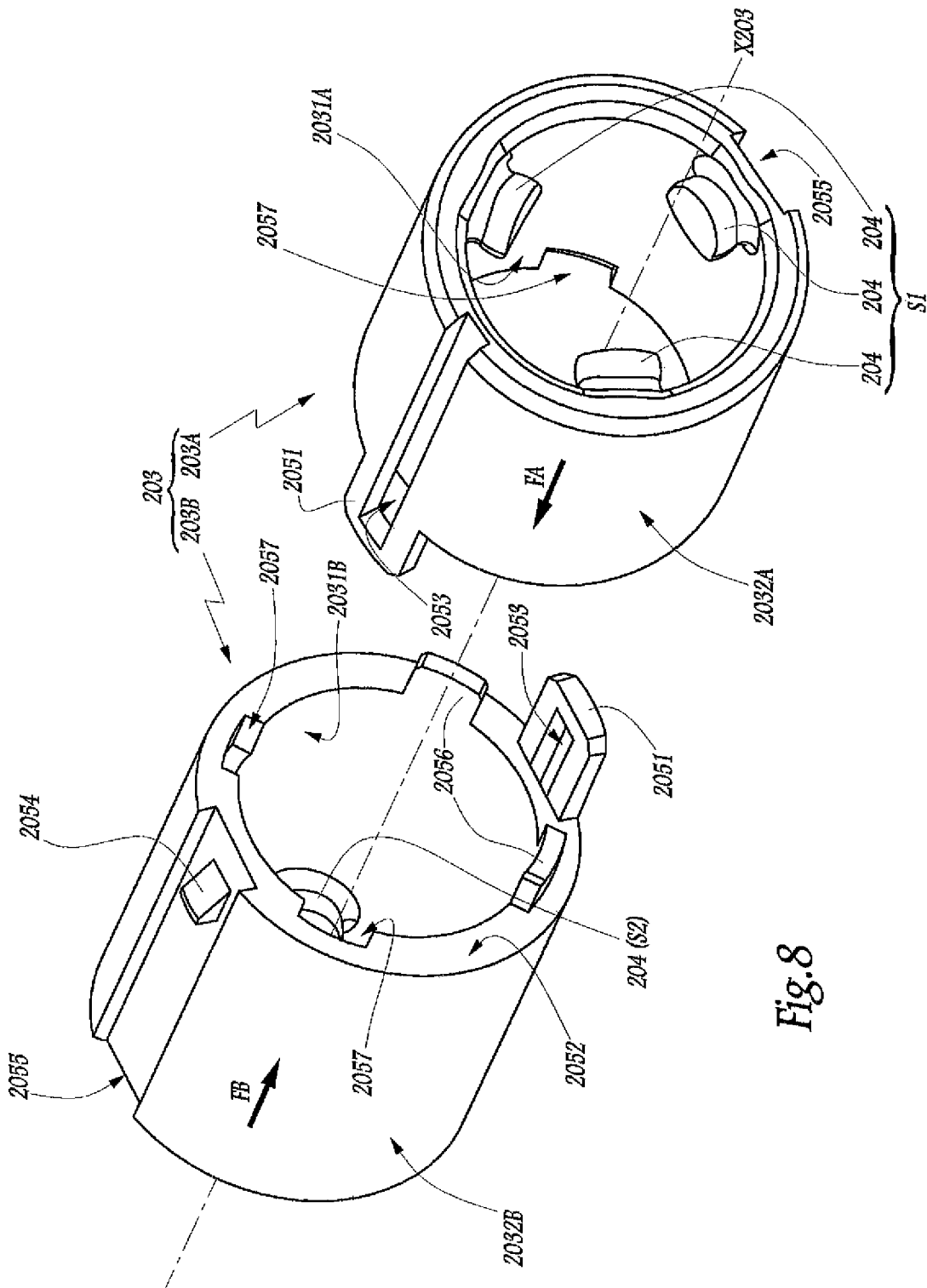
FIG. 8 is an exploded perspective view of a sleeve belonging to a coupling device according to a fourth embodiment of the invention.

In FIG. 8, only the sleeve 203 of a coupling device according to a fourth embodiment of the invention is shown. The end pieces of this device are identical to those of the first embodiment. The sleeve 203 is in two parts, in that it is formed by assembling two identical integral parts 203A and 203B. Each of the parts 203A and 203B includes a series of three lugs 204, the series S1 of the lugs 204 of the part 203A being shown in FIG. 8, whereas only one of the lugs 204 of the series S2 of the part 203B is seen in this figure.

Each part 203A and 203 is provided with a tab 2051 projecting from an end surface 2052 oriented towards the other part. Each tab 2051 is provided with a central opening 2053 for receiving a cog 2054 arranged at the centre of a groove 2055 provided in the outer surface 2032A or 2032B of each part 203A or 203B. From the end surface 2052 of each part 203A or 203B, two tabs 2056 extend, intended to be inserted into slots 2057 of a corresponding shape provided on the inner surface 2031A or 2031B of the part 203A or 203B in question.

In this way, the sleeve 203 is formed by aligning the parts 203A and 203B on the axis X203 of the sleeve, by placing the end surfaces 2052 thereof opposite each other, approaching the parts 203A and 203B by translation along the axis X203 and by inserting the tab 2051 of each part into the groove 2055 of the other part until the cog 2054 of the other part enters the opening 2053 of each tab. This approaching movement is represented by the arrows FA and FB in FIG. 8.

During the approach, the tabs 2056 of one part 203A or 203B are inserted into the slots 2057 of the other part, and vice versa.

The geometry of the parts 203A and 203B is chosen so that, when they are assembled to form the sleeve 203 together, the series S1 and S2 of lugs 204 thereof are angularly offset by an angle γ, for example equal to 60°.

This embodiment is particularly suitable for small-diameter coupling devices intended to be integrated in actuators less than 30 mm, for example equal to 25 or 28 mm, in diameter. Indeed, the parts 203A and 203B may be moulded relatively easily, more easily than the integral sleeve according to the third embodiment in the case of a small-diameter sleeve.

Figure 9:
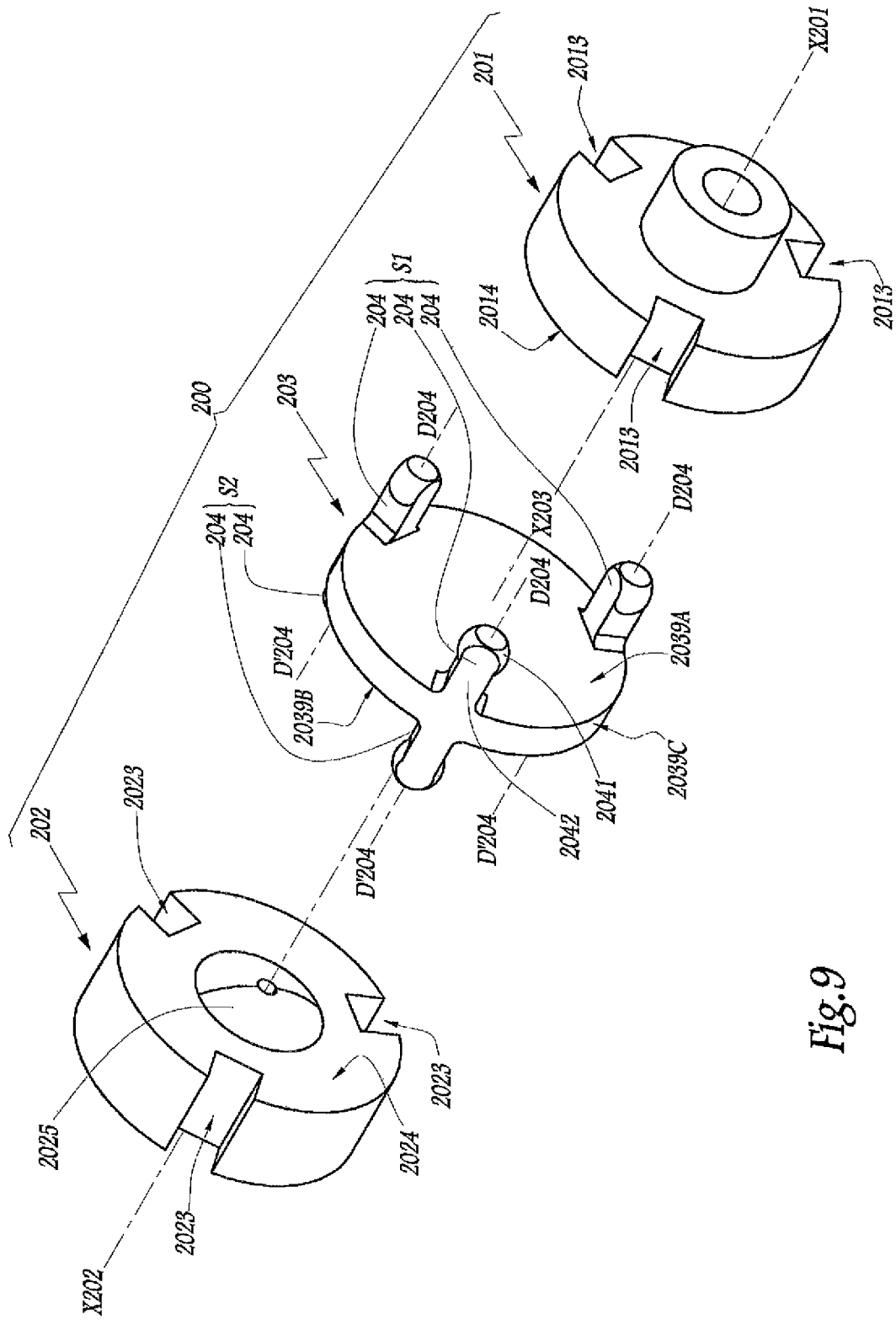
FIG. 9 is an exploded perspective view of a coupling device according to a fifth embodiment of the invention.

In the fifth embodiment shown in FIG. 9, the two end pieces 201 and 202 of a device 200 according to the invention are respectively provided with three grooves 2013 and 2023 distributed at 120° about a central axis X201 or X202 of the end piece 201 or 202 in question.

These end pieces 201 and 202 engage with a plate 203 which is also part of the device 200, suitable for the rotatable coupling of the end pieces 201 and 202 and which is centred on an axis X203 which is generally parallel to the axes X201 and X202 in the configuration for use. The plate 203 is arranged between the end pieces 201 and 202, along one of the axes X201 and X202.

The plate 203 includes two axial surfaces 2039A and 2039B which are perpendicular to the axis X203 and generally in the shape of a disk. These surfaces form the axial ends of the central part of the plate 203.

From the surface 2039A, three lugs 204 extend, forming a first series S1 of lugs each intended to be inserted into a groove 2013 of the end piece 201.

Each lug 204 of this series of lugs extends along a direction D204 parallel to the axis X203 and moving away from the surface 2039A.

Each lug 2041 includes a shank 2042 and a head 2041 forming the end thereof opposite the surface 2039A which is in the shape of a spherical segment. The inner and outer radial surfaces of the head 2041 of a lug 204 are truncated to extend from the inner and outer radial surfaces of the shank 2042 thereof. Moreover, the end surface of a head 2041 is also truncated, restricting the length thereof, measured parallel to the direction d204 or the axis X203.

The surface 2039B of the plate 203 is also provided with three lugs 204 of which two can be seen in FIG. 9 and which have substantially the same geometry as the lugs 204 of the first series of lugs, except that they each extend along a direction D'204 parallel to the axis X203 and oriented in the opposite direction in relation to a direction D104. In other words, the lugs 204 of the second series S2 extend, in relation to a defined disk-shaped central portion 2039C, axially along the axis X203, between the surfaces 2039A and 2039B, in an opposite direction in relation to the lugs 204 of the first series S1.

The lugs 204 of each series S1 and S2 are distributed at 120° about the axis X203 and the lugs of the two series are arranged extending from each other. In other words, the lugs 204 of the two series S1 and S2 are aligned along the directions D204 and D'204 which are parallel to the axis X203.

Alternatively, the lugs of the series S1 and S2 may be angularly offset about the axis X203.

Moreover, the axial surface 2024 of the end piece 202 which is perpendicular to the axis X202 and oriented towards the plate 203 is provided with a portion 2025 projecting parallel with the axis X203 and in the shape of a spherical segment. This portion 2025 bears against the surface 2039B in the assembled configuration of the coupling device 200. Similarly, the axial surface 2014 of the end piece 201 which is perpendicular to the axis X201 and oriented towards the plate 203 is equipped with a convex projecting portion, in the shape of a spherical segment, which is not shown in FIG. 9 but which bears against the surface 2039A of the plate 203. These projecting portions in the shape of a spherical segment provided on the input and output end pieces 201 and 202, respectively, are suitable for reinforcing the coupling since they create a tangential contact point between the parts 201 and 203, on one hand, and 202 and 203, on the other. This contact point is active in all the configurations of the device 200, including when the axes X201 and X202 are not aligned. This contact point is suitable for limiting parasitic friction at the interface between the parts 201, 202 and 203.

Alternatively, only one of the end pieces 201 and 202 is equipped with such a projecting portion 2025 or equivalent. According to a further alternative embodiment, a projecting portion comparable to the portion 2025 is provided on one of the surfaces 2039A and 2039B or on these two surfaces. In this case, the surfaces 2014 and 2024 are devoid thereof.

According to a further alternative embodiment, the plate 203 is not in axial contact with the end pieces 201 and 202 at the surfaces 2014, 2024, 2039A and 2039B. In this case, it is not necessary to provide an equivalent projecting portion similar to the portions 2025 on these surfaces.

In the various embodiments, the sleeve or the plate 203 may be made of synthetic material, particularly thermoplastic.

According to one alternative embodiment of the invention not shown, the end pieces 201 and 202 may be replaced by the ends of the shafts 105 and 106 which are then machined to form the grooves 2013 and 2023. These ends then form members rotatably secured to these shafts, according to the invention.

According to a further alternative embodiment also not shown, the end pieces 201 and 202 may be identical and provided with a staged central bore hole suitable for the assembly thereof on shafts of two different diameters. In this case, the longitudinal outer grooves thereof open at both ends thereof. It is then necessary to provide further means, not shown, to axially fix the sleeve of the first four embodiments on the shaft thereof. Indeed, this sleeve, in the examples described, is axially fixed by means of the lugs to the blind bottom of the grooves.

The invention is described hereinafter in the context of use with a rolling shutter provided with a flexible sliding panel. It is also applicable with further types of shutters or blinds and with an image projection screen. The invention is also applicable for operating a leaf, such as a gate leaf or a shutter hinged about a vertical axis in the vicinity of a passage opening, such as a door or a window.

Regardless of the embodiment or alternative embodiment envisaged, the coupling element 203 is rigid when used in the device 200, enabling effective torque transmission between the end pieces 201 and 202. Due to the engagement of the lugs 204 with the grooves 2013 and 2023, there is movement capability in a plurality of directions, at the interface between the parts 201 and 203, on one hand, 202 and 203, on the other, without requiring the use of a complex structure of multiple parts.

The technical features of the embodiments and alternative embodiments envisaged above may be combined together.

The invention claimed is:

1. A coupling device for drivingly coupling an output shaft of an electric motor and an input shaft of a reducing gear of an actuator for driving a screen or a leaf which are parts of home automation equipment for opening and closing, solar protection or projection, the output shaft and the input shaft being respectively centered on longitudinal axes which are in theory parallel and aligned with each other, the coupling device comprising:
a first member which is adapted to be rotatably secured to the output shaft, and which is provided with at least one longitudinal outer groove, and
a second member which is adapted to be rotatably secured, to the input shaft, and which is provided with at least one longitudinal outer groove, and
wherein the coupling device also includes a coupling element for coupling the first and second members together in rotation, which has, on at least one surface thereof, at least two series of lugs projecting from the at least one surface, wherein the lugs are inserted into the at least one longitudinal outer groove of the first member and the at least one longitudinal outer groove of the second member, respectively, and wherein each lug includes a spherical section head projecting from the at least one surface of the coupling element.

2. The coupling device according to claim 1, wherein the coupling element is an open sleeve in an internal volume whereof the first and second members are at least partially inserted and in that the lugs of the at least two series of lugs project from an inner radial surface of the sleeve which forms the at least one surface of the coupling element.

3. The coupling device according to claim 1, wherein the coupling element is a plate arranged between the first and second members, along an axis of rotation of one of the first and second members, and in that the lugs of the at least two series of lugs project from two axial surfaces of the plate, in two opposite directions parallel to the axis of rotation.

4. The coupling device according to claim 3, wherein an axial surface of the first member, the second member or the plate is provided with a portion projecting in a direction parallel to a central axis of the plate, the projecting portion bearing on an axial surface of the plate, the first member or the second member.

5. The coupling device according to claim 1, wherein the coupling element is a plate centered on an axis parallel to a longitudinal axes of the first and second members and lugs from the at least two series of lugs extending outwardly from opposite surfaces of the plate.

6. The coupling device according to claim 1, wherein each first and second member is provided with a plurality of longitudinal outer grooves and the coupling element is equipped with a plurality of lugs, equal in number to a sum of the numbers of longitudinal outer grooves of the first and second members, with a first series of lugs situated in a vicinity of a first axial end of the coupling element and each of the first series of lugs being respectively inserted into one of the longitudinal outer grooves of the first member and a second series of lugs situated in the vicinity of a second axial end of the coupling element, opposite the first axial end, each of the second series of lugs being respectively inserted into one of the longitudinal outer grooves of the second member.

7. The coupling device according to claim 6, wherein the longitudinal outer grooves and the lugs are regularly distributed, respectively about longitudinal and central axes of the first and second members and the coupling element.

8. The coupling device according to claim 1, wherein each of the first and second members include a plurality of generally parallel longitudinal outer grooves, the at least two series of lugs extending radially inwardly from an inner surface of the coupling element and such that a first series of lugs are offset, angularly, about a longitudinal and central axis of the coupling element, in relation to a second series of lugs of the at least two series of lugs.

9. The coupling device according to claim 8, wherein the longitudinal outer grooves and the lugs of the first and second series of lugs are regularly distributed, respectively, about the longitudinal and central axes of the first and second members and the coupling element and in that an angular offset ($\gamma$) between two lugs respectively belonging to the first and second series has a value equal to half the value of the angular offset ($\alpha$, $\beta$) between two lugs of a same series of lugs.

10. The coupling device according to claim 1, wherein the lugs of the at least two series are aligned in directions parallel to a central axis of the coupling element.

11. The coupling device according to claim 1, wherein each of the first and second members is provided with three longitudinal outer grooves distributed at 120° about a central axis of the first and second members and the coupling element is equipped with three lugs in each of the two series of lugs, the lugs of each series being distributed at 120° relative to one another about a longitudinal and central axis of the coupling element.

12. The coupling device according to claim 1, wherein the coupling element is provided, on at least one angular sector situated between two lugs of the same series of lugs, with a recess.

13. The coupling device according to claim 1, wherein the first and second members are parts made of sintered metal.

14. The coupling device according to claim 1, wherein the first and second members are identical parts with one part mounted on the output shaft of the motor and the other part mounted on the input shaft of the reduction gear.

15. The coupling device according to claim 1, wherein the lugs are parts mounted on the coupling element and locked thereon to rotate with the coupling element.

16. The coupling device according to claim 15, wherein the coupling element is provided with axial grooves each suitable for slidably receiving a lug anchoring shank and each bordered by a space for receiving an end heel of the lug anchoring shank.

17. The coupling device to claim 15, wherein the coupling element is provided with housings for receiving and locking lug anchoring shanks.

18. The coupling device according to claim 1, wherein the lugs of the at least two sets of lugs are integral with the coupling element.

19. A home automation equipment including a closure device selected from a group of devices consisting of a leaf, a closing or solar protection screen and a projection screen, and a coupling device inserted between an output shaft of an electric motor and an input shaft of a reducing gear for driving the device wherein the coupling device comprises a first member which is adapted to be rotatably secured to the output shaft, and which is provided with at least one longitudinal outer groove, and a second member which is adapted to be rotatably secured, to the input shaft, and which is provided with at least one longitudinal outer groove, and wherein the coupling device also includes a coupling element for coupling the first and second members together in rotation, which has, on at least one surface thereof, at least two series of lugs projecting from the at least one surface, wherein lugs are inserted into the longitudinal outer groove of the first member and the longitudinal outer groove of the second member, respectively.

* * * * *